(12) United States Patent
Terauchi

(10) Patent No.: US 8,750,391 B2
(45) Date of Patent: Jun. 10, 2014

(54) DIFFERENTIAL SIGNAL OUTPUT DEVICE AND PORTABLE DEVICE

(75) Inventor: Ryota Terauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 286 days.

(21) Appl. No.: 13/235,622

(22) Filed: Sep. 19, 2011

(65) Prior Publication Data

US 2012/0140853 A1    Jun. 7, 2012

(30) Foreign Application Priority Data

Dec. 6, 2010   (JP) ................................. 2010-271572

(51) Int. Cl.
*H04B 3/00*   (2006.01)

(52) U.S. Cl.
USPC ......................................................... 375/257

(58) Field of Classification Search
CPC ..... G06F 1/10; H04L 25/0276; H04L 25/028; H04L 25/0272; H04L 25/0298; H03K 5/135; H03K 19/018514; H03K 19/018528; H03K 19/00361; H03H 7/46
USPC ......................................................... 375/257
See application file for complete search history.

(56) References Cited

U.S. PATENT DOCUMENTS

| | | | |
|---|---|---|---|
| 7,589,559 B2 | 9/2009 | Shim et al. | |
| 7,872,498 B2 | 1/2011 | Shim et al. | |
| 2008/0169838 A1 | 7/2008 | Shim et al. | |
| 2009/0239559 A1* | 9/2009 | Hollis | ............................ 455/500 |
| 2009/0323830 A1 | 12/2009 | Shim et al. | |
| 2010/0120383 A1* | 5/2010 | Kikuchi et al. | ............. 455/114.2 |
| 2011/0037759 A1* | 2/2011 | Fukuda | .......................... 345/213 |
| 2011/0043690 A1* | 2/2011 | Ozawa | ........................... 348/495 |
| 2011/0293041 A1* | 12/2011 | Luo et al. | ........................ 375/316 |

FOREIGN PATENT DOCUMENTS

| | | |
|---|---|---|
| JP | 06-350422 A | 12/1994 |
| JP | 2008-160858 A | 7/2008 |

OTHER PUBLICATIONS

Texas Instruments, Slew Rate Control of LVDS Circuits, SLLA034A, Application Report, Mar. 1999.
Japanese Office Action issued on Jan. 17, 2014 in corresponding Japanese Application No. 2010-271572, along with English translation thereof.

* cited by examiner

*Primary Examiner* — Don N Vo
(74) *Attorney, Agent, or Firm* — White & Case LLP

(57) ABSTRACT

A differential signal output device includes a first transmitting terminal and a second transmitting terminal that superimpose a differential signal and a common mode signal and output the superimposed signals. The differential signal output device includes a differential signal generating circuit that generates the differential signal in response to a data signal and outputs the differential signal to the first transmitting terminal and the second transmitting terminal. The differential signal output device includes a common mode signal generating circuit that generates the common mode signal in response to a clock signal, outputs the common mode signal to the first transmitting terminal and the second transmitting terminal, and controls a slew rate of the common mode signal in response to a control signal.

16 Claims, 5 Drawing Sheets

DIFFERENTIAL SIGNAL OUTPUT DEVICE AND PORTABLE DEVICE

CROSS-REFERENCE TO RELATED APPLICATION

This application is based upon and claims the benefit of priority from the prior Japanese Patent Application No. 2010-271572, filed on Dec. 6, 2010, the entire contents of which are incorporated herein by reference.

BACKGROUND

1. Field

Embodiments described herein relate generally to a differential signal output device and a portable device.

2. Background Art

In recent years, differential transmission standards such as low voltage differential signaling (LVDS) and high-definition multimedia interface (HDMI) have been widely used as means for transmitting a large number of signals between digital devices such as televisions, PCs, and mobile phones through a small number of wires.

In order to transmit a data signal with a driver at a rate exceeding 1 Gbps, the rise time and fall time of the data signal have to be a high slew rate of, for example, several hundreds ps.

However, a signal outputted from the driver with a high slew rate may cause emission of high-frequency noise of, for example, electromagnetic interference (EMI).

Thus the slew rate of the output signal from the driver has to be properly controlled according to transmission standards for transmitting data between digital devices, transmission lines that connect devices, and so on.

DETAILED DESCRIPTION

A differential signal output device, according to an embodiment, includes a first transmitting terminal and a second transmitting terminal that superimpose a differential signal and a common mode signal and output the superimposed signals. The differential signal output device includes a differential signal generating circuit that generates the differential signal in response to a data signal and outputs the differential signal to the first transmitting terminal and the second transmitting terminal. The differential signal output device includes a common mode signal generating circuit that generates the common mode signal in response to a clock signal, outputs the common mode signal to the first transmitting terminal and the second transmitting terminal, and controls a slew rate of the common mode signal in response to a control signal.

The following will describe embodiments of the present invention in accordance with the accompanying drawings.

[First Embodiment]

Figure 1:
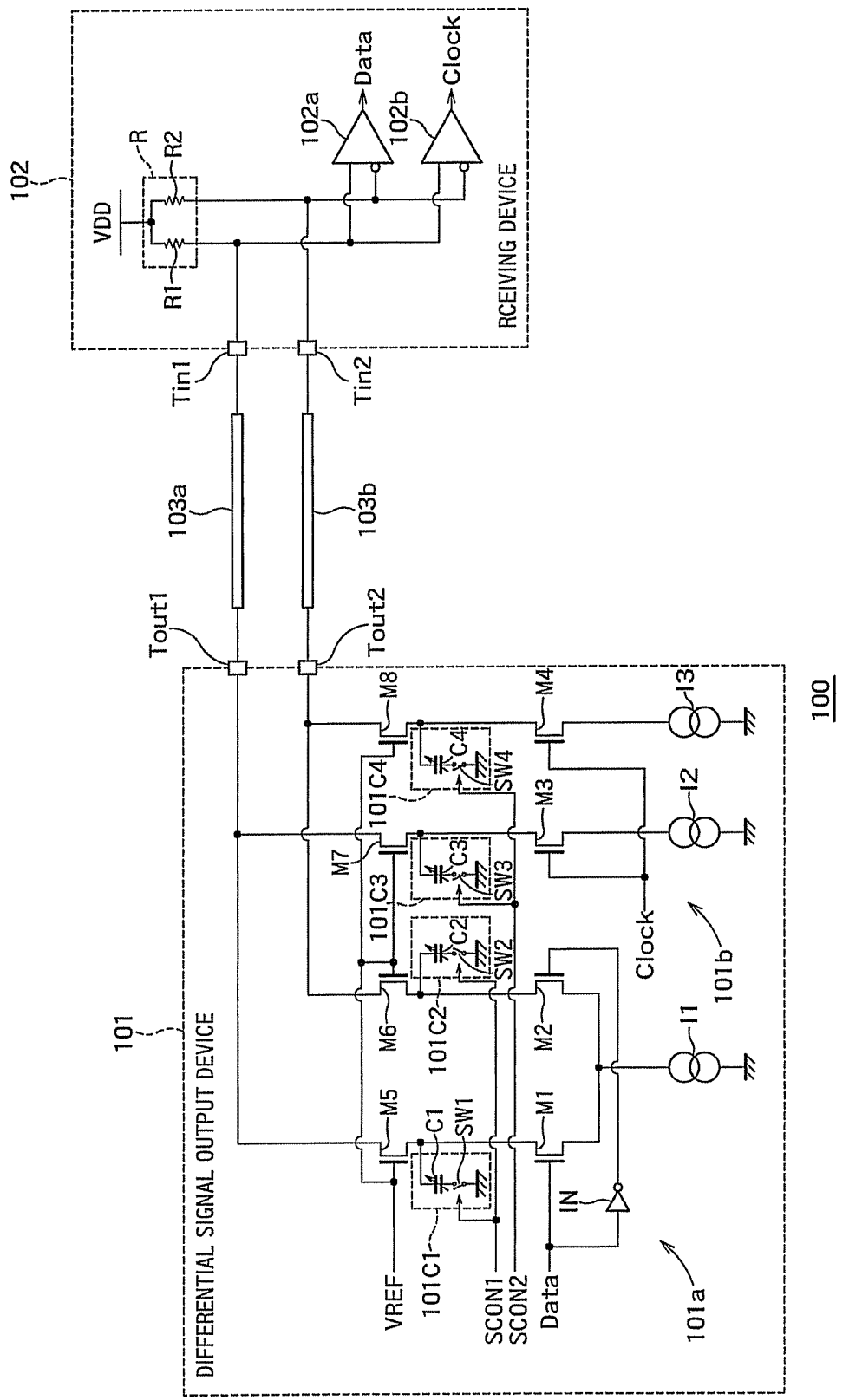
FIG. 1 is a diagram showing an example of the configuration of a transmission system 100 including a differential signal output device 101 according to an embodiment.

FIG. 1 shows an example of the configuration of a transmission system 100 including a differential signal output device 101 according to an embodiment.

As shown in FIG. 1, the transmission system 100 includes the differential signal output device (driver) 101, a pair of differential signal lines 103a and 103b, and a receiving device (receiver) 102.

The differential signal output device 101 includes a first transmitting terminal Tout1, a second transmitting terminal Tout2, a differential signal generating circuit 101a, and a common mode signal generating circuit 101b.

The first transmitting terminal Tout1 is connected to one end of the differential signal line 103a.

The second transmitting terminal Tout2 is connected to one end of the differential signal line 103b.

The first transmitting terminal Tout1 and the second transmitting terminal Tout2 superimpose a differential signal and a common mode signal and output the signals to the pair of differential signal lines 103a and 103b.

The differential signal generating circuit 101a generates the differential signal in response to a data signal Data and outputs the differential signal to the first transmitting terminal Tout1 and the second transmitting terminal Tout2. Moreover, the differential signal generating circuit 101a controls the slew rate of the differential signal in response to a first control signal SCON1.

The common mode signal generating circuit 101b generates the common mode signal in response to a clock signal Clock and outputs the common mode signal to the first transmitting terminal Tout1 and the second transmitting terminal Tout2. Moreover, the common mode signal generating circuit 101b controls the slew rate of the common mode signal in response to a second control signal SCON2.

As shown in FIG. 1, the differential signal generating circuit 101a includes a first current source I1, a first MOS transistor M1, a second MOS transistor M2, a fifth MOS transistor M5, a sixth MOS transistor M6, a first capacitance adjusting circuit 101c1, a second capacitance adjusting circuit 101c2, and an inverter IN.

The first current source I1 has one end connected to the ground and outputs a first current having a current value Idata.

The first MOS transistor M1 is, for example, an nMOS transistor in this configuration. The first MOS transistor M1 has one end (source) connected to the other end of the first current source I1 and the other end (drain) connected to the first transmitting terminal Tout1 via the fifth MOS transistor M5. The data signal Data is inputted to the gate of the first MOS transistor M1 to turn on/off the first MOS transistor M1.

The second MOS transistor M2 is an nMOS transistor of the same conductivity type as the first MOS transistor M1. The second MOS transistor M2 has one end (source) connected to the other end of the first current source I1 and the other end (drain) connected to the second transmitting terminal Tout2 via the sixth MOS transistor M6. An inverted signal that is equivalent to a signal inverted in phase from the data signal Data (a signal inverted in phase from the data signal Data by the inverter IN) is inputted to the gate of the second MOS transistor M2 to turn on/off the second MOS transistor M2.

The second MOS transistor M2 is identical in size to the first MOS transistor M1.

The fifth MOS transistor M5 is, for example, an nMOS transistor in this configuration. The fifth MOS transistor M5 has one end (source) connected to the other end (drain) of the first MOS transistor M1 and the other end (drain) connected to the first transmitting terminal Tout1. The gate of the fifth MOS transistor M5 is fed with a reference voltage VREF that allows the fifth MOS transistor M5 to operate in a saturation region. Thus the fifth MOS transistor M5 has a high output impedance.

The sixth MOS transistor M6 is, for example, an nMOS transistor like the fifth MOS transistor M5 in this configuration. The sixth MOS transistor M6 has one end (source) connected to the other end (drain) of the second MOS transistor M2 and the other end (drain) connected to the second transmitting terminal Tout2. The gate of the sixth MOS transistor M6 is fed with the reference voltage VREF that allows the sixth MOS transistor M6 to operate in the saturation region. Thus the sixth MOS transistor M6 has a high output impedance.

The sixth MOS transistor M6 is identical in size to the fifth MOS transistor M5.

The first capacitance adjusting circuit 101c1 is connected between one end (source) of the fifth MOS transistor M5 and the ground. The first capacitance adjusting circuit 101c1 has a capacitance that is adjusted in response to the first control signal SCON1 (adjustable electric capacitance).

As shown in FIG. 1, the first capacitance adjusting circuit 101c1 includes, for example, a first capacitor C1 and a first switch circuit SW1.

The first capacitor C1 is connected between one end (source) of the fifth MOS transistor M5 and the ground. The first capacitor C1 is, for example, a variable capacitor.

The first switch circuit SW1 is connected between the first capacitor C1 and the ground and is controlled in response to the first control signal SCON1.

The first switch circuit SW1 is, for example, a MOS transistor whose gate receives the first control signal SCON1. For example, in the case where the first control signal SCON1 is "1", that is, "High" level, the MOS transistor is turned on and the first capacitor C1 is connected to the ground at a low impedance. In the case where the first control signal SCON1 is "0", that is, "Low" level, the MOS transistor is turned off and the first capacitor C1 is connected to the ground at a high impedance.

The second capacitance adjusting circuit 101c2 is connected between one end (source) of the sixth MOS transistor M6 and the ground. The second capacitance adjusting circuit 101c2 has a capacitance that is adjusted in response to the first control signal SCON1 (adjustable electric capacitance).

As shown in FIG. 1, the second capacitance adjusting circuit 101c2 includes, for example, a second capacitor C2 and a second switch circuit SW2.

The second capacitor C2 is connected between one end (source) of the sixth MOS transistor M6 and the ground. The second capacitor C2 is, for example, a variable capacitor.

The second switch circuit SW2 is connected between the second capacitor C2 and the ground and is controlled in response to the first control signal SCON1.

The second switch circuit SW2 is, for example, a MOS transistor whose gate receives the first control signal SCON1. For example, in the case where the first control signal SCON1 is "1", that is, "High" level, the MOS transistor is turned on and the second capacitor C2 is connected to the ground at a low impedance. In the case where the first control signal SCON1 is "0", that is, "Low" level, the MOS transistor is turned off and the second capacitor C2 is connected to the ground at a high impedance.

As shown in FIG. 1, the common mode signal generating circuit 101b includes a second current source I2, a third current source I3, a third MOS transistor M3, a fourth MOS transistor M4 of the same conductivity type as the third MOS transistor, a seventh MOS transistor M7, an eighth MOS transistor M8, a third capacitance adjusting circuit 101c3, and a fourth capacitance adjusting circuit 101c4.

The second current source I2 has one end connected to the ground and outputs a second current.

The third MOS transistor M3 is, for example, an NMOS transistor in this configuration. The third MOS transistor M3 has one end (source) connected to the other end of the second current source I2 and the other end (drain) connected to the first transmitting terminal Tout1 via the seventh MOS transistor M7. The clock signal Clock is inputted to the gate of the third MOS transistor M3 to turn on/off the third MOS transistor M3.

The third current source I3 has one end connected to the ground and outputs a third current. The second current and the third current are set at the same current value Iclock.

The fourth MOS transistor M4 is an nMOS transistor of the same conductivity type as the third MOS transistor M3. The fourth MOS transistor M4 has one end (source) connected to the other end of the third current source I3 and the other end connected to the second transmitting terminal Tout2 via the eighth MOS transistor M8. The clock signal Clock is inputted to the gate of the fourth MOS transistor M4 to turn on/off the fourth MOS transistor M4.

The fourth MOS transistor M4 is identical in size to the third MOS transistor M3.

The seventh MOS transistor M7 is, for example, an nMOS transistor in this configuration. The seventh MOS transistor M7 is connected between the other end (source) of the third MOS transistor M3 and the first transmitting terminal Tout1. The gate of the seventh MOS transistor M7 is fed with the reference voltage VREF. Thus the seventh MOS transistor M7 has a high output impedance.

The eighth MOS transistor M8 is, for example, an nMOS transistor like the seventh MOS transistor M7 in this configuration. The eighth MOS transistor M8 is connected between the other end (drain) of the fourth MOS transistor M4 and the second transmitting terminal Tout2. The gate of the eighth MOS transistor M8 is fed with the reference voltage VREF that allows the eighth MOS transistor M8 to operate in the saturation region. Thus the eighth MOS transistor M8 has a high output impedance.

The eighth MOS transistor M8 is identical in size to the seventh MOS transistor M7.

The third capacitance adjusting circuit 101c3 is connected between one end (source) of the seventh MOS transistor M7 and the ground. The third capacitance adjusting circuit 101c3 has a capacitance that is adjusted in response to the second control signal SCON2.

As shown in FIG. 1, the third capacitance adjusting circuit 101c3 includes, for example, a third capacitor C3 and a third switch circuit SW3.

The third capacitor C3 is connected between one end (source) of the seventh MOS transistor M7 and the ground. The third capacitor C3 is, for example, a variable capacitor.

The third switch circuit SW3 is connected between the third capacitor C3 and the ground and is controlled in response to the second control signal SCON2.

The third switch circuit SW3 is, for example, a MOS transistor whose gate receives the second control signal SCON2.

For example, in the case where the second control signal SCON2 is "1", that is, "High" level, the MOS transistor is turned on and the third capacitor C3 is connected to the ground at a low impedance. In the case where the second control signal SCON2 is "0", that is, "Low" level, the MOS transistor is turned off and the third capacitor C3 is connected to the ground at a high impedance.

The fourth capacitance adjusting circuit 101c4 is connected between one end (source) of the eighth MOS transistor M8 and the ground. The fourth capacitance adjusting circuit 101c4 has a capacitance that is adjusted in response to the second control signal SCON2.

As shown in FIG. 1, the fourth capacitance adjusting circuit 101c4 includes, for example, a fourth capacitor C4 and a fourth switch circuit SW4.

The fourth capacitor C4 is connected between one end (source) of the eighth MOS transistor M8 and the ground. The fourth capacitor C4 is, for example, a variable capacitor.

The fourth switch circuit SW4 is connected between the fourth capacitor C4 and the ground and is controlled in response to the second control signal SCON2.

The fourth switch circuit SW4 is, for example, a MOS transistor whose gate receives the second control signal SCON2. For example, in the case where the second control signal SCON2 is "1", that is, "High" level, the MOS transistor is turned on and the fourth capacitor C4 is connected to the ground at a low impedance. In the case where the second control signal SCON2 is "0", that is, "Low" level, the MOS transistor is turned off and the fourth capacitor C4 is connected to the ground at a high impedance.

In the example of FIG. 1, the reference voltage VREF applied to the gates of the fifth and sixth MOS transistors M5 and M6 is equal to the reference voltage VREF applied to the gates of the seventh and eighth MOS transistors M7 and M8.

The reference voltage VREF applied to the gates of the fifth and sixth MOS transistors M5 and M6 may be different from the reference voltage VREF applied to the gates of the seventh and eighth MOS transistors M7 and M8.

As shown in FIG. 1, the receiving device 102 includes a first receiving terminal Tin1, a second receiving terminal Tin2, an impedance circuit R, and receiver circuits 102a and 102b.

The first receiving terminal Tin1 is connected to the other end of the differential signal line 103a.

The second receiving terminal Tin2 is connected to the other end of the differential signal line 103b.

The first receiving terminal Tin1 and the second receiving terminal Tin2 each receive the differential signal and the common mode signal from the pair of differential signal lines 103a and 103b.

The impedance circuit R includes a first terminating resistor R1 having one end connected to a power supply and the other end connected to the first receiving terminal Tin1, and a second terminating resistor R2 having one end connected to the power supply and the other end connected to the second receiving terminal Tin2.

The first terminating resistor R1 and the second terminating resistor R2 each have a resistance value RT. The resistance value RT is selected so as to allow impedance matching to the differential signal lines while suppressing reflected waves in the receiving device 102.

The receiver circuit 102a has inputs respectively connected to the first and second receiving terminals Tin1 and Tin2, receives the differential signal, and outputs the data signal Data.

The receiver circuit 102b has inputs respectively connected to the first and second receiving terminals Tin1 and Tin2, receives the common mode signal, and outputs the clock signal Clock.

Figure 2:
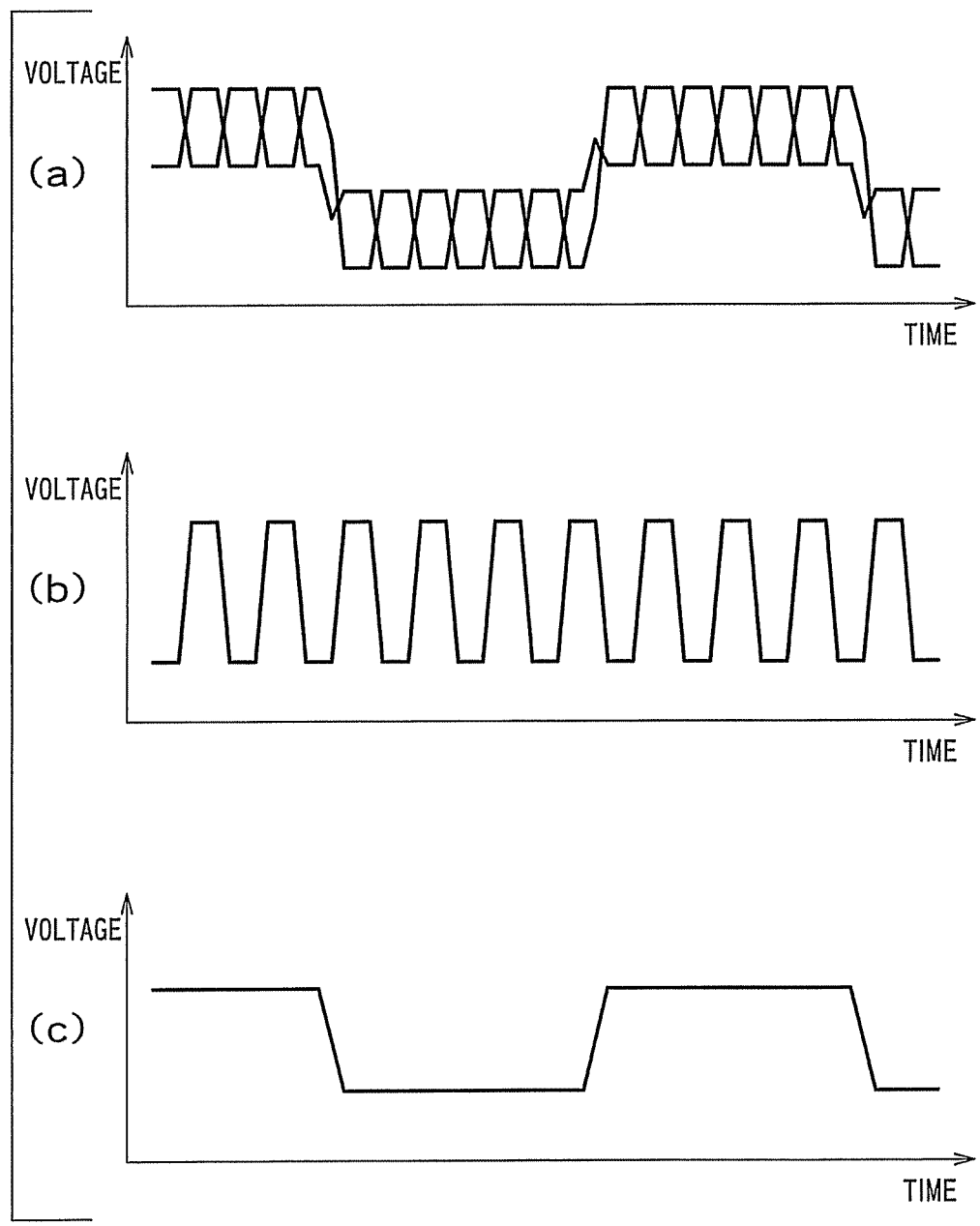
FIGS. 2(A) to 2(C) are diagrams showing examples of the waveforms of the output signals of the differential signal output device 101 shown in FIG. 1.

The following will describe the operations of the differential signal output device 101 configured thus. FIGS. 2(A) to 2(C) show examples of the waveforms of the output signals of the differential signal output device 101 shown in FIG. 1.

First, for simplification, (1) and (2) will describe operations for the data signal Data and (3) and (4) will describe operations for the clock signal Clock.

(1) For example, in the case where the data signal Data is "1", that is, "High" level, the first MOS transistor M1 is turned on and the second MOS transistor M2 is turned off.

In this case, the first MOS transistor M1 is connected to the first current source I1, so that the first MOS transistor M1 is fed with the first current having the current value Idata from the first current source I1.

At this point, the terminating resistor R1 of the receiving device 102 is connected to the first transmitting terminal Tout1 and has the resistance value RT, so that the potential of the first transmitting terminal Tout1 is a power supply potential VDD−the current value Idata×the resistance value RT. Since the second MOS transistor M2 is turned off, current does not pass through the second MOS transistor M2. In other words, the potential of the second transmitting terminal Tout2 is equal to the power supply potential VDD.

(2) In the case where the data signal Data is "0", that is, "Low" level, the first MOS transistor M1 is turned off and the second MOS transistor M2 is turned on.

At this point, the second MOS transistor M2 is fed with the first current having the current value Idata from the first current source I1. Thus the potential of the second transmitting terminal Tout2 is the power supply potential VDD−the current value Idata×the resistance value RT. Since the first MOS transistor M1 is turned off, current does not pass through the first MOS transistor M1 and the potential of the first transmitting terminal Tout1 is equal to the power supply potential VDD.

The first and second MOS transistors M1 and M2 are switched in response to the data signal Data, so that the differential signal of the power supply potential VDD and the power supply potential VDD−the current value Idata×the resistance value RT is generated at each of the first and second transmitting terminals Tout1 and Tout2 (FIG. 2(B)).

(3) For example, in the case where the clock signal Clock is "1", that is, "High" level, the third and fourth MOS transistors M3 and M4 are turned on.

In this case, the third and fourth MOS transistors M3 and M4 are connected to the second and third current sources I2 and I3, respectively. Thus the current having the current value Iclock from the second current source I2 passes through the third MOS transistor M3 and the current having the current value Iclock from the third current source I3 passes through the fourth MOS transistor M4.

At this point, the potential of the first transmitting terminal Tout1 is the power supply potential VDD−the current value Iclock×the resistance value RT and the potential of the second transmitting terminal Tout2 is the power supply potential VDD−the current value Iclock×the resistance value RT.

(4) In the case where the clock signal Clock is "0", that is, "Low" level, the third and fourth MOS transistors M3 and M4 are turned off.

In this case, the third and fourth MOS transistors M3 and M4 are turned off, so that current does not pass through the third and fourth MOS transistors M3 and M4 and the potentials of the first and second transmitting terminals Tout1 and Tout2 are equal to the power supply potential VDD.

The third and fourth MOS transistors M3 and M4 are switched thus in response to the clock signal Clock, so that an in-phase signal of the power supply potential VDD and the power supply potential VDD−the current value Iclock×the resistance value RT is generated at the first and second transmitting terminals Tout1 and Tout2 (FIG. 2(C)).

The following will describe the operations of the differential signal output device 101 in a state in which (1) to (4) are combined to input the data signal Data and the clock signal Clock.

In the case of (1)+(3), the data signal Data is "1", that is, "High" level and the clock signal is "1", that is, "High" level. In this case, the first, third, and fourth MOS transistors M1, M3, and M4 are turned on and the second MOS transistor M2 is turned off.

At this point, the potential of the first transmitting terminal Tout1 is the power supply potential VDD−(the current value Idata+the current value Iclock)×the resistance value RT and the potential of the second transmitting terminal Tout2 is the power supply potential VDD−(the current value Iclock)×the resistance value RT.

In the case of (1)+(4), the data signal Data is "1", that is, "High" level and the clock signal is "0", that is, "Low" level. In this case, the first MOS transistor M1 is turned on and the second, third, and fourth MOS transistors M2, M3, and M4 are turned off.

At this point, the potential of the first transmitting terminal Tout1 is the power supply potential VDD−the current value Idata×the resistance value RT and the potential of the second transmitting terminal Tout2 is the power supply potential VDD.

In the case of (2)+(3), the data signal Data is "0", that is, "Low" level and the clock signal is "1", that is, "High" level. In this case, the second, third, and fourth MOS transistors M2, M3, and M4 are turned on and the first MOS transistor M1 is turned off.

At this point, the potential of the first transmitting terminal Tout1 is the power supply potential VDD−the current value Iclock×the resistance value RT and the potential of the second transmitting terminal Tout2 is the power supply potential VDD−(the current value Idata+the current value Iclock)×the resistance value RT.

In the case of (2)+(4), the data signal Data is "0", that is, "Low" level and the clock signal is "0", that is, "Low" level. In this case, the second MOS transistor M2 is turned on and the first, third, and fourth MOS transistors M1, M3, and M4 are turned off.

At this point, the potential of the first transmitting terminal Tout1 is the power supply potential VDD and the potential of the second transmitting terminal Tout2 is the power supply potential VDD−the current value Idata×the resistance value RT.

The first and second transmitting terminals Tout1 and Tout2 at this point have operation waveforms shown in FIG. 2(A).

In this way, the differential signal output device 101 can output the differential signal corresponding to the data signal Data and the common mode signal corresponding to the clock signal Clock to the pair of transmitting terminals.

Noise generated from the differential signal output device 101 may be caused by the differential signal or the common mode signal. In the case of the differential signal, current passes through the signal lines in opposite directions and noise generated in the opposite directions cancel each other, so that only small noise is generated by the differential signal.

In the case of the common mode signal, current passes through the signal lines in the same direction and noise does not cancel each other. Thus noise generated by the common mode signal is larger than the noise of the differential signal. In the present embodiment, the slew rates of the differential signal and the common mode signal are separately controlled, thereby suppressing noise generated by the differential signal and the common mode signal while securing desired slew rates.

In the following example, the differential signal output device 101 separately controls the slew rate of the data signal Data (differential signal) and the slew rate of the clock signal Clock (common mode signal).

For example, in the case where the first control signal SCON1 is "1", that is, "High" level, the first switch circuit SW1 and the second switch circuit SW2 are turned on.

At this point, the first capacitor C1 is connected between the other end (drain) of the first MOS transistor M1 and the ground and the capacitor C2 is connected between the other end (drain) of the second MOS transistor M2 and the ground.

The other ends (drains) of the first and second MOS transistors M1 and M2 are charged or discharged in response to the switching of the data signal Data. The charge/discharge time is extended by adding the capacitors to the drains.

The capacitance values of the terminals connected to the drains of the first and second MOS transistors M1 and M2 are controlled thus in response to the first control signal SCON1, thereby controlling the slew rate of the differential signal outputted to the first and second transmitting terminals Tout1 and Tout2.

For example, in the case where the second control signal SCON2 is "1", that is, "High" level, the third switch circuit SW3 and the fourth switch circuit SW4 are turned on.

At this point, the third capacitor C3 is connected between the other end (drain) of the third MOS transistor M3 and the ground and the fourth capacitor C4 is connected between the other end (drain) of the fourth MOS transistor M4 and the ground.

The other ends (drains) of the third and fourth MOS transistors M3 and M4 are charged or discharged in response to the switching of the data signal Data. The charge/discharge time is extended by adding the capacitors to the drains.

The capacitance values of the terminals connected to the third and fourth MOS transistors M3 and M4 are controlled thus in response to the second control signal SCON2, thereby controlling the slew rate of the common mode signal outputted to the first and second transmitting terminals Tout1 and Tout2.

As described above, the fifth and sixth MOS transistors M5 and M6 whose gates receive the reference voltage VREF have high output impedances.

Hence, when the third and fourth MOS transistors M3 and M4 are switched and the other ends (drains) of the third and fourth MOS transistors M3 and M4 are charged or discharged, the third and fourth MOS transistors M3 and M4 are hardly affected by the capacitances of the capacitors C1 and C2.

Similarly, as described above, the third and fourth MOS transistors M7 and M8 whose gates receive the reference voltage VREF have high output impedances.

Hence, when the first and second MOS transistors M1 and M2 are switched and the other ends (drains) of the first and second MOS transistors M1 and M2 are charged or discharged, the first and second MOS transistors M1 and M2 are hardly affected by the capacitances of the third and fourth capacitors C3 and C4.

In this way, the first and second capacitance adjusting circuits 101c1 and 101c2 can control the slew rate of the data signal Data (differential signal) and the third and fourth capacitance adjusting circuits 101c3 and 101c4 can independently control the slew rate of the clock signal Clock (common mode signal).

As described above, the differential signal output device of the present embodiment can more properly control the slew rate of the output signal.

Particularly, it is possible to adjust the slew rates of the differential signal and the common mode signal, of the differential signal output device according to transmission lines and receiving devices which are varied among products, thereby transmitting signals with suppressed noise.

[Second Embodiment]

In second embodiment, capacitance adjusting circuits are omitted in a differential signal output device unlike in the first embodiment.

Figure 3:
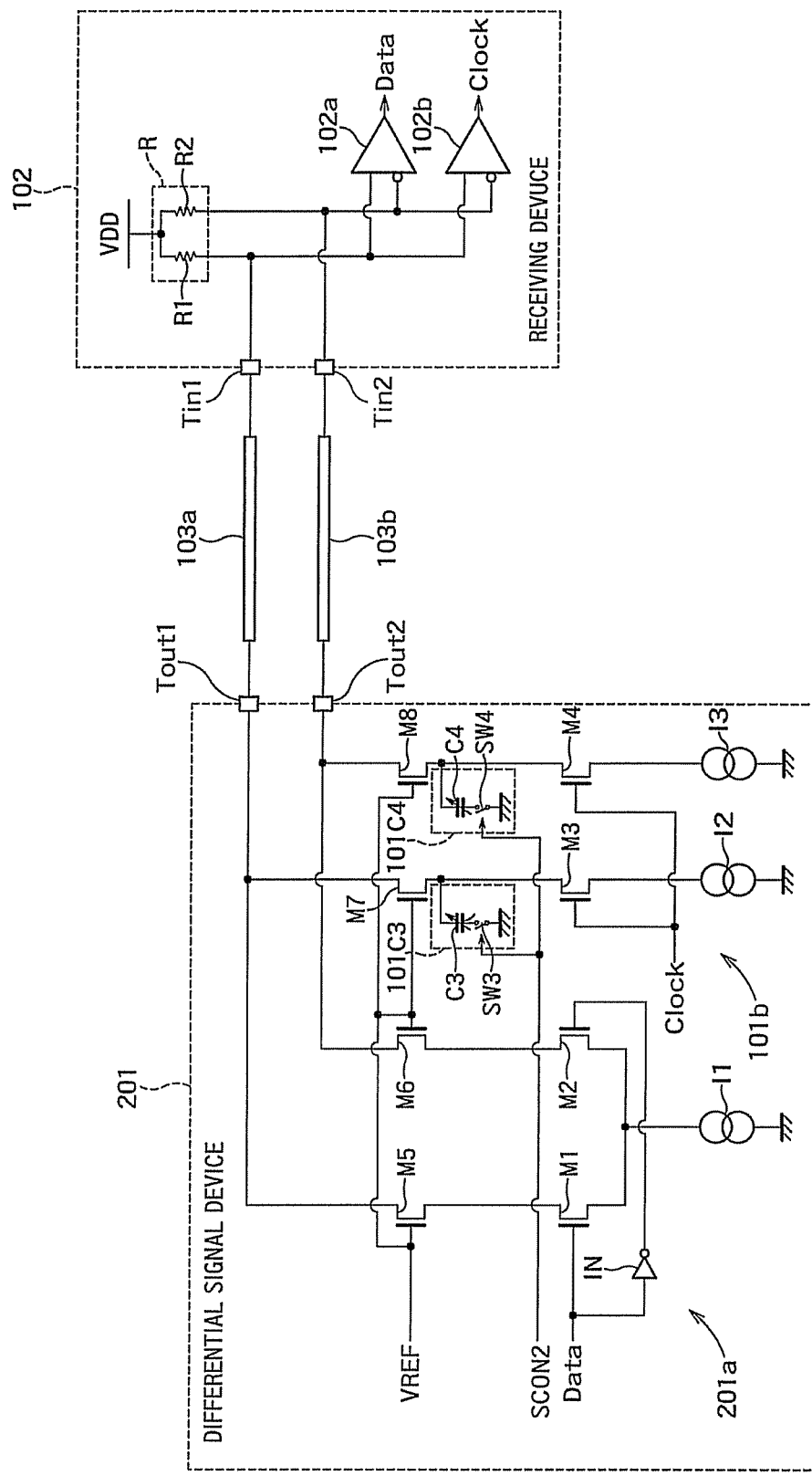
FIG. 3 is a diagram showing an example of the configuration of a transmission system 200 including a differential signal output device 201 according to the present embodiment.

FIG. 3 shows an example of the configuration of a transmission system 200 including a differential signal output device 201 according to the present embodiment. In FIG. 3, the same reference numerals as in FIG. 1 indicate the same configurations as those of the first embodiment.

As shown in FIG. 3, the transmission system 200 includes the differential signal output device (driver) 201, a pair of differential signal lines 103a and 103b, and a receiving device (receiver) 102.

The differential signal output device 201 includes a first transmitting terminal Tout1, a second transmitting terminal Tout2, a differential signal generating circuit 201a, and a common mode signal generating circuit 101b.

The differential signal generating circuit 201a having a different configuration from the first embodiment generates a differential signal in response to a data signal Data and outputs the differential signal to the first transmitting terminal Tout1 and the second transmitting terminal Tout2.

The differential signal generating circuit 201a includes a first current source I1, a first MOS transistor M1, a second MOS transistor M2, a fifth MOS transistor M5, a sixth MOS transistor M6, and an inverter IN.

In other words, unlike in the differential signal generating circuit 101a of the first embodiment, first and second capacitance adjusting circuits 101c1 and 101c2 are omitted in the differential signal generating circuit 201a. Hence, the differential signal generating circuit 201a does not have the function of adjusting the slew rate of the differential signal.

Other configurations of the differential signal output device 201 are similar to those of the differential signal output device 101 of the first embodiment.

Specifically, the common mode signal generating circuit 101b generates a common mode signal in response to a clock signal Clock and outputs the common mode signal to the first transmitting terminal Tout1 and the second transmitting terminal Tout2. Furthermore, the common mode signal generating circuit 101b controls the slew rate of the common mode signal in response to a second control signal SCON2. In other words, the slew rate of the clock signal Clock (common mode signal) can be controlled by third and fourth capacitance adjusting circuits 101c3 and 101c4.

Moreover, the provision of the fifth and sixth MOS transistors M5 and M6 allows the first and second MOS transistors M1 and M2 to have a low withstanding voltage, thereby increasing the speeds of the first and second MOS transistors M1 and M2.

The fifth and sixth MOS transistors M5 and M6 may be omitted in the differential signal generating circuit 201a. In this case, the first and second MOS transistors M1 and M2 require high withstanding voltages.

As described above, the differential signal output device of the present embodiment can more properly control the slew rate of the output signal.

Particularly, it is possible to adjust the slew rate of the common mode signal of the differential signal output device according to transmission lines and receiving devices which are varied among products, thereby transmitting signals with suppressed noise.

[Third Embodiment]

In a third embodiment, capacitance adjusting circuits are omitted in a common mode signal generating circuit unlike in the first embodiment.

Figure 4:
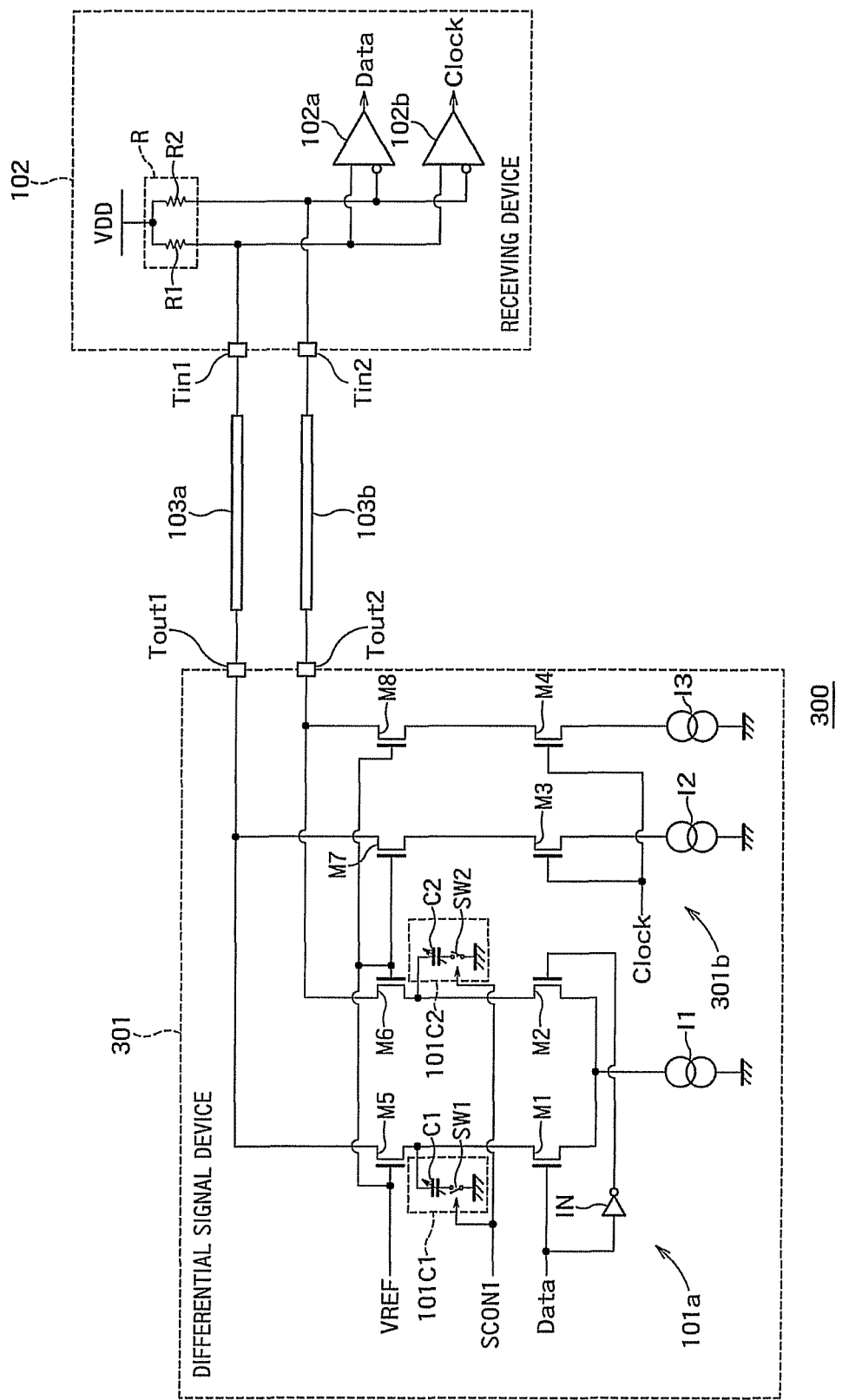
FIG. 4 is a diagram showing an example of the configuration of a transmission system 300 including a differential signal output device 301 according to the present embodiment.

FIG. 4 shows an example of the configuration of a transmission system 300 including a differential signal output device 301 according to the present embodiment. In FIG. 4, the same reference numerals as in FIG. 1 indicate the same configurations as those of the first embodiment.

As shown in FIG. 4, the transmission system 300 includes the differential signal output device (driver) 301, a pair of differential signal lines 103a and 103b, and a receiving device (receiver) 102.

The differential signal output device 301 includes a first transmitting terminal Tout1, a second transmitting terminal Tout2, a differential signal generating circuit 101a, and a common mode signal generating circuit 301b.

The common mode signal generating circuit 301b having a different configuration from the first embodiment generates a common mode signal in response to a clock signal Clock and transmits the common mode signal to the first transmitting terminal Tout1 and the second transmitting terminal Tout2.

The common mode signal generating circuit 301b includes a second current source I2, a third current source I3, a third MOS transistor M3, a fourth MOS transistor M4 of the same conductivity type as the third MOS transistor, a seventh MOS transistor M7, and an eighth MOS transistor M8.

In other words, unlike in the common mode signal generating circuit 101b of the first embodiment, third and fourth capacitance adjusting circuits 101c3 and 101c4 are omitted in the common mode signal generating circuit 301b. Hence, the common mode signal generating circuit 301b does not have the function of adjusting the slew rate of the common mode signal.

Other configurations of the differential signal output device 301 are similar to those of the differential signal output device 101 of the first embodiment.

Specifically, the differential signal generating circuit 101a generates a differential signal in response to a data signal Data and outputs the differential signal to the first transmitting terminal Tout1 and the second transmitting terminal Tout2. Furthermore, the differential signal generating circuit 101a controls the slew rate of the differential signal in response to a first control signal SCON1. In other words, the slew rate of the data signal Data (differential signal) can be controlled by first and second capacitance adjusting circuits 101c1 and 101c2.

Moreover, the provision of the seventh and eighth MOS transistors M7 and M8 allows the third and fourth MOS transistors M3 and M4 to have a low withstanding voltage, thereby increasing the speeds of the third and fourth MOS transistors M3 and M4.

The seventh and eighth MOS transistors M7 and M8 may be omitted in the common mode signal generating circuit 301b. In this case, the third and fourth MOS transistors M3 and M4 require high withstand voltages.

As described above, the differential signal output device of the present embodiment can more properly control the slew rate of the output signal.

Particularly, it is possible to adjust the slew rate of the differential signal of the differential signal output device according to transmission lines and receiving devices which are varied among products, thereby transmitting signals with suppressed noise.

[Fourth Embodiment]

A fourth embodiment will describe an example of a system in which the differential signal output devices of the foregoing embodiments are applied to a portable device.

Figure 5:
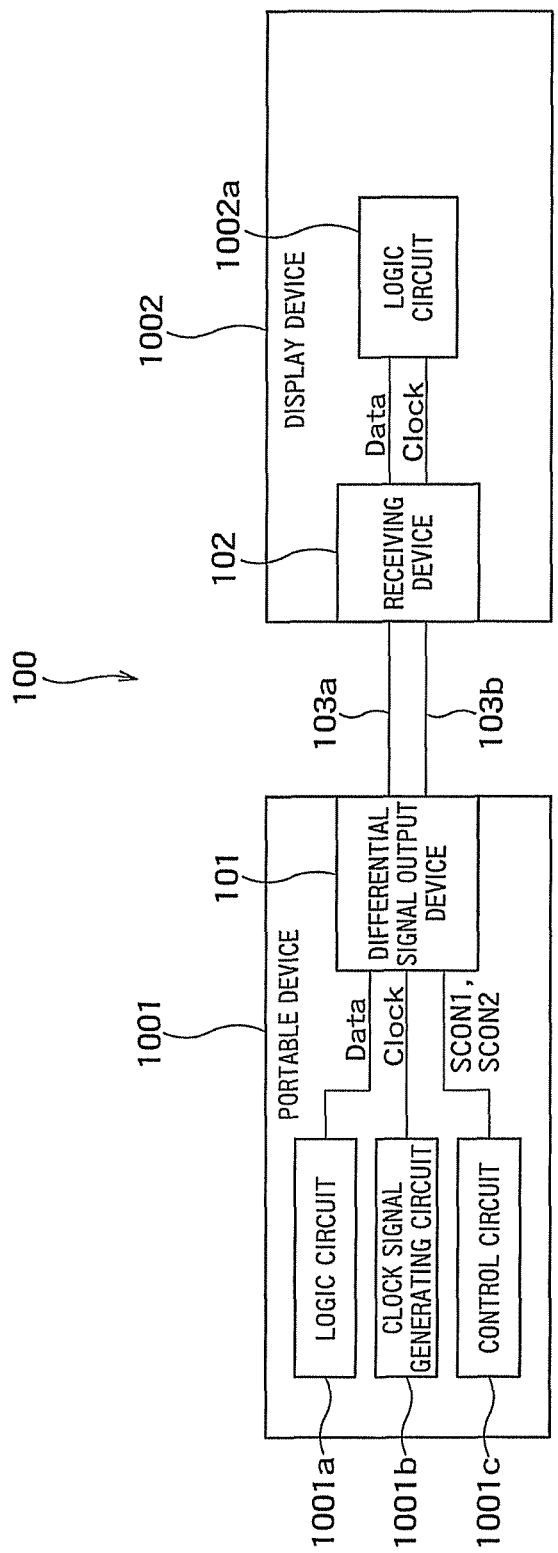
FIG. 5 is a block diagram showing a configuration including a portable device 1001 and a display device.

FIG. 5 is a block diagram showing a configuration including a portable device 1001 and a display device. The transmission system 100 of FIG. 1 is applied to this configuration.

As shown in FIG. 5, for example, the portable device 1001 such as a mobile phone includes a logic circuit 1001a, a clock signal generating circuit 1001b, a control circuit 1001c, and a differential signal output device 101.

The logic circuit 1001a outputs a data signal Data.

The clock signal generating circuit 1001b outputs a clock signal Clock.

As described above, the differential signal output device 101 outputs a differential signal and a common mode signal in response to the data signal Data and the clock signal Clock.

The control circuit 1001c outputs control signals SCON1 and SCON2 for controlling the differential signal output device 101.

For example, a display device 1002 such as a television monitor includes a receiving device 102 and a logic circuit 1002a that receives the data signal Data and the clock signal Clock from the receiving device 102.

In the portable device 1001 configured thus, a slew rate is properly controlled by the differential signal output device 101, so that the data signal Data and the clock signal Clock with suppressed noise can be outputted to the receiving device 102 of the display device 1002 through differential signal lines 103a and 103b.

In the example of FIG. 5, the transmission system 100 is used. The transmission systems 200 and 300 are also applicable.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A differential signal output device comprising:
a first transmitting terminal and a second transmitting terminal that superimpose a differential signal and a common mode signal and output the superimposed signals;
a differential signal generating circuit that generates the differential signal in response to a data signal and outputs the differential signal to the first transmitting terminal and the second transmitting terminal; and
a common mode signal generating circuit that generates the common mode signal in response to a clock signal, outputs the common mode signal to the first transmitting terminal and the second transmitting terminal, and controls a slew rate of the common mode signal in response to a control signal,
wherein the common mode signal generating circuit comprises:
a first MOS transistor having a first end connected to a ground via a first current source, and having a gate receiving the clock signal;
a second MOS transistor having a first end connected to the ground via a second current source, and having a gate receiving the clock signal;
a third MOS transistor having a first end connected to a second end of the first MOS transistor, and having a second end connected to the first transmitting terminal;
a fourth MOS transistor having a first end connected to the second end of the second MOS transistor, and having a second end connected to the second transmitting terminal;
a first capacitance adjusting circuit that is connected between the first end of the third MOS transistor and the ground and has an electric capacitance adjustable in response to the control signal; and
a second capacitance adjusting circuit that is connected between the first end of the fourth MOS transistor and the ground and has an electric capacitance adjustable in response to the control signal.

2. The differential signal output device according to claim 1, wherein differential signal generating circuit comprises:
a fifth MOS transistor having a first end connected to the ground via a third current source, having a second end connected to the first transmitting terminal, and having a gate receiving the data signal;
a sixth MOS transistor of the same conductivity type as the fifth MOS transistor, the sixth MOS transistor having a first end connected to the ground via the third current source, having a second end connected to the first transmitting terminal, and having a gate receiving an inverted signal that is equivalent to a signal inverted in phase from the data signal; and
a seventh MOS transistor connected between the second end of the fifth MOS transistor and the first transmitting terminal;
an eighth MOS transistor connected between the second end of the sixth MOS transistor and the second transmitting terminal.

3. The differential signal output device according to claim 2, wherein the first capacitance adjusting circuit comprises:
a first capacitor connected between the first end of the third MOS transistor and the ground; and
a first switch circuit that is connected between the first capacitor and the ground and is controlled in response to the control signal;
wherein the second capacitance adjusting circuit comprises:
a second capacitor connected between the first end of the fourth MOS transistor and the ground; and
a second switch circuit that is connected between the second capacitor and the ground and is controlled in response to the control signal.

4. The differential signal output device according to claim 2, wherein gates of the seventh MOS transistor and the eighth MOS transistor are fed with a reference voltage VREF that allows the seventh MOS transistor and the eighth MOS transistor to operate in a saturation region.

5. The differential signal output device according to claim 1,
wherein the first capacitance adjusting circuit comprises:
a first capacitor connected between the first end of the third MOS transistor and the ground; and a first switch circuit that is connected between the first capacitor and the ground and is controlled in response to the control signal;
wherein the second capacitance adjusting circuit comprises:
a second capacitor connected between the first end of the fourth MOS transistor and the ground; and
a second switch circuit that is connected between the second capacitor and the ground and is controlled in response to the control signal.

6. The differential signal output device according to claim 1, wherein gates of the third MOS transistor and the fourth MOS transistor are fed with a reference voltage VREF that allows the third MOS transistor and the fourth MOS transistor to operate in a saturation region.

7. A differential signal output device comprising:
a first transmitting terminal and a second transmitting terminal that superimpose a differential signal and a common mode signal and output the superimposed signals;
a differential signal generating circuit that generates the differential signal in response to a data signal, outputs the differential signal to the first transmitting terminal and the second transmitting terminal, and controls a slew rate of the differential signal in response to a first control signal; and
a common mode signal generating circuit that generates the common mode signal in response to a clock signal, and outputs the common mode signal to the first transmitting terminal and the second transmitting terminal,
wherein the differential signal generating circuit comprises:
a first MOS transistor having a first end connected to a ground via a first current source, and having a gate receiving the data signal;
a second MOS transistor of the same conductivity type as the first MOS transistor, the second MOS transistor having a first end connected to the ground via the first current source, and having a gate receiving an inverted signal that is equivalent to a signal inverted in phase from the data signal;
a third MOS transistor having a first end connected to a second end of the first MOS transistor, and having a second end connected to the first transmitting terminal;
a fourth MOS transistor having a first end connected to the second end of the second MOS transistor, and having a second end connected to the second transmitting terminal;
a first capacitance adjusting circuit that is connected between the first end of the third MOS transistor and the ground and has an electric capacitance adjustable in response to the first control signal; and
a second capacitance adjusting circuit that is connected between the first end of the fourth MOS transistor and the ground and has an electric capacitance adjustable in response to the first control signal.

8. The differential signal output device according to claim 7, wherein the first capacitance adjusting circuit comprises:
a first capacitor connected between the first end of the third MOS transistor and the ground; and
a first switch circuit that is connected between the first capacitor and the ground and is controlled in response to the first control signal;
wherein the second capacitance adjusting circuit comprises:
a second capacitor connected between the first end of the fourth MOS transistor and the ground; and
a second switch circuit that is connected between the second capacitor and the ground and is controlled in response to the first control signal.

9. The differential signal output device according to claim 7, wherein the third capacitance adjusting circuit comprises:
a third capacitor connected between the first end of the seventh MOS transistor and the ground; and
a third switch circuit that is connected between the third capacitor and the ground and is controlled in response to the second control signal;
wherein the fourth capacitance adjusting circuit comprises:
a fourth capacitor connected between the first end of the eighth MOS transistor and the ground; and
a fourth switch circuit that is connected between the fourth capacitor and the ground and is controlled in response to the second control signal.

10. The differential signal output device according to claim 7, wherein gates of the third MOS transistor and the fourth MOS transistor are fed with a reference voltage VREF that allows the third MOS transistor and the fourth MOS transistor to operate in a saturation region.

11. A differential signal output device comprising:
a first transmitting terminal and a second transmitting terminal that superimpose a differential signal and a common mode signal and output the superimposed signals;
a differential signal generating circuit that generates the differential signal in response to a data signal, outputs the differential signal to the first transmitting terminal and the second transmitting terminal, and controls a slew rate of the differential signal in response to a first control signal; and
a common mode signal generating circuit that generates the common mode signal in response to a clock signal, and outputs the common mode signal to the first transmitting terminal and the second transmitting terminal,
wherein the common mode signal generating circuit controls a slew rate of the common mode signal in response to a second control signal, and
wherein the common mode signal generating circuit comprises:
a fifth MOS transistor having a first end connected to a ground via a first current source, having a second end connected to the first transmitting terminal, and having a gate receiving the clock signal;
a sixth MOS transistor having a first end connected to the ground via a second current source, having a second end connected to the second transmitting terminal, and having a gate receiving the clock signal;
a seventh MOS transistor connected between the second end of the fifth MOS transistor and the first transmitting terminal;
an eighth MOS transistor connected between the second end of the sixth MOS transistor and the second transmitting terminal;
a third capacitance adjusting circuit that is connected between the first end of the seventh MOS transistor and the ground and has an electric capacitance adjustable in response to the second control signal; and
a fourth capacitance adjusting circuit that is connected between the first end of the eighth MOS transistor and the ground and has an electric capacitance adjustable in response to the second control signal.

12. The differential signal output device according to claim 11, wherein gates of the seventh MOS transistor and the eighth MOS transistor are fed with a reference voltage VREF that allows the seventh MOS transistor and the eighth MOS transistor to operate in a saturation region.

13. A portable device comprising:
a logic circuit that outputs a data signal;
a clock signal generating circuit that outputs a clock signal;
a differential signal output device that outputs a differential signal and a common mode signal in response to the data signal and the clock signal; and
a control circuit that outputs a control signal for controlling the differential signal output device,
wherein the differential signal output device comprising:
a first transmitting terminal and a second transmitting terminal that superimpose a differential signal and a common mode signal and output the superimposed signals;
a differential signal generating circuit that generates the differential signal in response to a data signal and outputs the differential signal to the first transmitting terminal and the second transmitting terminal; and
a common mode signal generating circuit that generates the common mode signal in response to a clock signal, outputs the common mode signal to the first transmitting terminal and the second transmitting terminal, and controls a slew rate of the common mode signal in response to a control signal,
wherein the common mode signal generating circuit comprises:
a first MOS transistor having a first end connected to a ground via a first current source, and having a gate receiving the clock signal;
a second MOS transistor having a first end connected to the ground via a second current source, and having a gate receiving the clock signal;
a third MOS transistor having a first end connected to a second end of the first MOS transistor, and having a second end connected to the first transmitting terminal;
a fourth MOS transistor having a first end connected to the second end of the second MOS transistor, and having a second end connected to the second transmitting terminal;
a first capacitance adjusting circuit that is connected between the first end of the third MOS transistor and the ground and has an electric capacitance adjustable in response to the control signal; and
a second capacitance adjusting circuit that is connected between the first end of the fourth MOS transistor and the ground and has an electric capacitance adjustable in response to the control signal.

14. The portable device according to claim 13,
wherein the first capacitance adjusting circuit comprises:
a first capacitor connected between the first end of the third MOS transistor and the ground; and
a first switch circuit that is connected between the first capacitor and the ground and is controlled in response to the control signal;
wherein the second capacitance adjusting circuit comprises:
a second capacitor connected between the first end of the fourth MOS transistor and the ground; and
a second switch circuit that is connected between the second capacitor and the ground and is controlled in response to the control signal.

15. The portable device according to claim 13, wherein differential signal generating circuit comprises:
a fifth MOS transistor having a first end connected to the ground via a third current source, having a second end connected to the first transmitting terminal, and having a gate receiving the data signal;
a sixth MOS transistor of the same conductivity type as the fifth MOS transistor, the sixth MOS transistor having a first end connected to the ground via the third current source, having a second end connected to the first transmitting terminal, and having a gate receiving an inverted signal that is equivalent to a signal inverted in phase from the data signal; and
a seventh MOS transistor connected between the second end of the fifth MOS transistor and the first transmitting terminal;
an eighth MOS transistor connected between the second end of the sixth MOS transistor and the second transmitting terminal.

16. The portable device according to claim 15, wherein the first capacitance adjusting circuit comprises:
a first capacitor connected between the first end of the third MOS transistor and the ground; and
a first switch circuit that is connected between the first capacitor and the ground and is controlled in response to the control signal;
wherein the second capacitance adjusting circuit comprises:
a second capacitor connected between the first end of the fourth MOS transistor and the ground; and
a second switch circuit that is connected between the second capacitor and the ground and is controlled in response to the control signal.

* * * * *